United States Patent [19]

Coast

[11] 4,104,764

[45] Aug. 8, 1978

[54] CRUSTACEAN CLAW-PROCESSING MACHINE

[76] Inventor: John B. Coast, Rte. 6, Box 328, Baton Rouge, La. 70815

[21] Appl. No.: 744,958

[22] Filed: Nov. 26, 1976

[51] Int. Cl.² ............................................. A22C 29/00
[52] U.S. Cl. .......................................... 17/71; 17/61
[58] Field of Search ................... 17/53, 57, 71, 74, 48, 17/52

[56] References Cited

U.S. PATENT DOCUMENTS

| | | | |
|---|---|---|---|
| 2,771,633 | 11/1956 | Bartels et al. | 17/57 |
| 3,303,526 | 2/1967 | LaPine et al. | 17/57 |
| 3,390,423 | 7/1968 | Tolley | 17/71 |
| 3,441,981 | 5/1969 | Tolley | 17/71 |
| 3,553,770 | 1/1971 | Ford | 17/52 |
| 3,555,595 | 1/1971 | Tolley | 17/71 |
| 3,715,981 | 2/1973 | Hoffman | 161/415.1 |
| 3,871,086 | 3/1975 | Rutledge | 17/73 |
| 3,962,752 | 6/1976 | Cooke et al. | 17/71 |
| 4,021,886 | 5/1977 | Crepeau | 17/71 |

*Primary Examiner*—Russell R. Kinsey
*Assistant Examiner*—Paul J. Hirsch

*Attorney, Agent, or Firm*—C. Emmett Pugh & Associates

[57] ABSTRACT

A crab claw processing machine for cutting and removal of the shell comprising a machine body having a rotating table mounted thereon. The rotating table has a plurality of rotary claw holders provided with individual drive sprockets mounted at its peripheral edge portion, each rotary claw holder being capable of holding a crab claw to be processed. As the rotating table is spun by a power source, such as an electric motor, the sprockets of each peripherally placed rotary claw holder engage a fixed drive chain which spins the respective sprocket rotary claw holder, and the crab claw contained therein. Each rotary claw holder and its contained crab claw are sequentially brought in to proximity with a high-speed rotating saw capable of cutting the claw. The saw can be provided with a gauge for controlling the depth of the cut. As the rotary claw holder brings the claw in contact with the saw, the spinning action of the rotary claw holder in cooperation with the cutting action of the saw to a desired depth (as set by the depth gauge), combine to make a peripheral cut through the outer hard crustacean body portion of the crab claw, thereby exposing the meat food product.

16 Claims, 8 Drawing Figures

CRUSTACEAN CLAW-PROCESSING MACHINE

BACKGROUND OF THE INVENTION

1. Field of the Invention

The present invention relates to food processing and food processing equipment, but more particularly the present invention relates to an apparatus for the processing of crustacean claws where the removal of the outer crustacean shell is effected by grasping the claw in a rotary holder, rotating the holder, and passing the rotating holder into contact with a cutting saw to thereby make a peripheral cut in the claw crustacean shell to remove the shell and thereby expose the inner meat product.

2. Prior Art

Several devices have been patented which teach the removal of crab meat and the like from the crustacean body of several types of marine creatures. These machines are generally directed to the removal of meat from the central, main body portion of the crustacean. Examples of such crustacea processing equipment can be found in U.S. Patent and Trademark Office Class 17, Subclasses 71, 73, 74 and 48.

However, a substantial meat product is also contained in the claw portion of several crustaceans, such as crabs, crawfish, lobsters, and the like. It is this hard crustacean claw with a meat product therein, for example a crab claw, to which the present invention is directed.

Heretofore, in order to remove the upper, outer shell from a claw to expose the meat, hand processing including hand cutting of the shell was required. The resultant product, commonly called a "cocktail claw" is highly desirable but also very expensive due to the relatively low volume hand labor expenses involved.

The machine of the present invention provides for the automatic cutting of the shell for the removal of the shell from the meat of the crab claw to thereby expose the meat. Thus, a substantial amount of food product which normally would be dependent on hand processing can be processed by the machine of the present invention.

General Discussion of the Invention

The present invention provides an apparatus for the removal of a meat product from the claw of a crustacean. The apparatus is comprised generally of a rigid frame having a rotatable table mounted thereon. The table can be mounted at an angle, and has rotary claw holders pivotally attached to its peripheral edge. Rotation of the rotating table moves each rotary claw holder to a position which causes it to pivot toward the inner portion of the rotating table or the outer portion of the rotating table depending upon its position by the force of gravity.

In the preferred embodiment, each rotary claw holder pivots away from the central portion of the table under the urging of gravity when the respective claw holder is at the lower tilted portion of the rotating table. Correspondingly, each pivotally mounted rotary claw holder pivots toward the inner portion of the rotating table when that respective rotary claw holder reaches the higher portion of the tilted rotary table.

A rotary saw is fixedly attached at the upper portion of the tilted rotary table and oriented so that the pivoting of each rotary claw holder towards the inner portion of the rotating table brings a crab claw (or the like) held within its respective rotary claw holder into contact with the rotary saw. Rotation of each rotary claw holder, and the coincident cutting action of the saw, produces a peripheral cut in the hard exoskeleton of the crustacean claw.

A depth gauge can be included to fix the depth at which the peripheral cut is made to insure that only the outer exoskeleton will be cut and not the inner meat product.

In the preferred embodiment, each rotary claw holder is spun by the engagement of a sprocket (rotatably mounted to the rotary claw holder and on a common shaft therewith) with a fixed chain affixed to the machine body near the rotary saw. The rotating table moves each rotary claw holder through an arcuate path adjacent the fixed chain to thereby intermesh the sprocket and the chain and thus impart the previously described rotation to each rotary claw holder.

In the preferred embodiment only a portion of the arc of travel of the rotating table engages the area of the fixed chain, thus rotary claw holders are spun only in the vicinity of the rotary saw where the spinning action is desirable for making the required peripheral cut to each crustacean claw.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Structure

Figure 1:
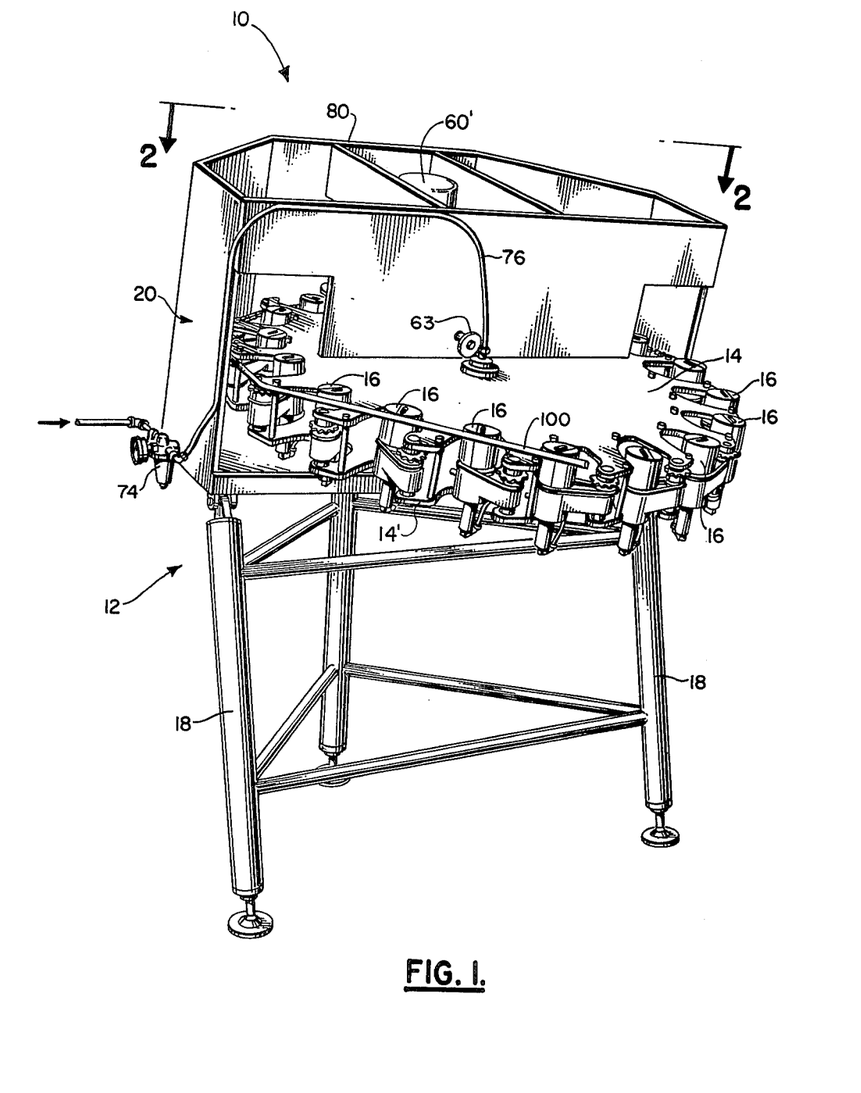
FIG. 1 is a perspective view of the preferred embodiment of the apparatus of the present invention.

As can best be seen by FIG. 1, the crab claw processing machine of the present invention, designated generally by the numeral 10, is comprised of a machine body or support frame 12 on which is rotatably mounted a rotating frame in the form of a table 14. The rotating table 14 is provided with a plurality of rotary claw holders 16 mounted at its peripheral edge portion.

Machine body 12 has lower leg portion 18 and an upper processing section 20. In the preferred embodiment the upper processing unit 20 is tilted with respect to legs 18, so that when the unit is placed on a substantially level floor, rotating table 14 will be oriented at a slight angle with the floor as illustrated in FIG. 1.

Figure 2:
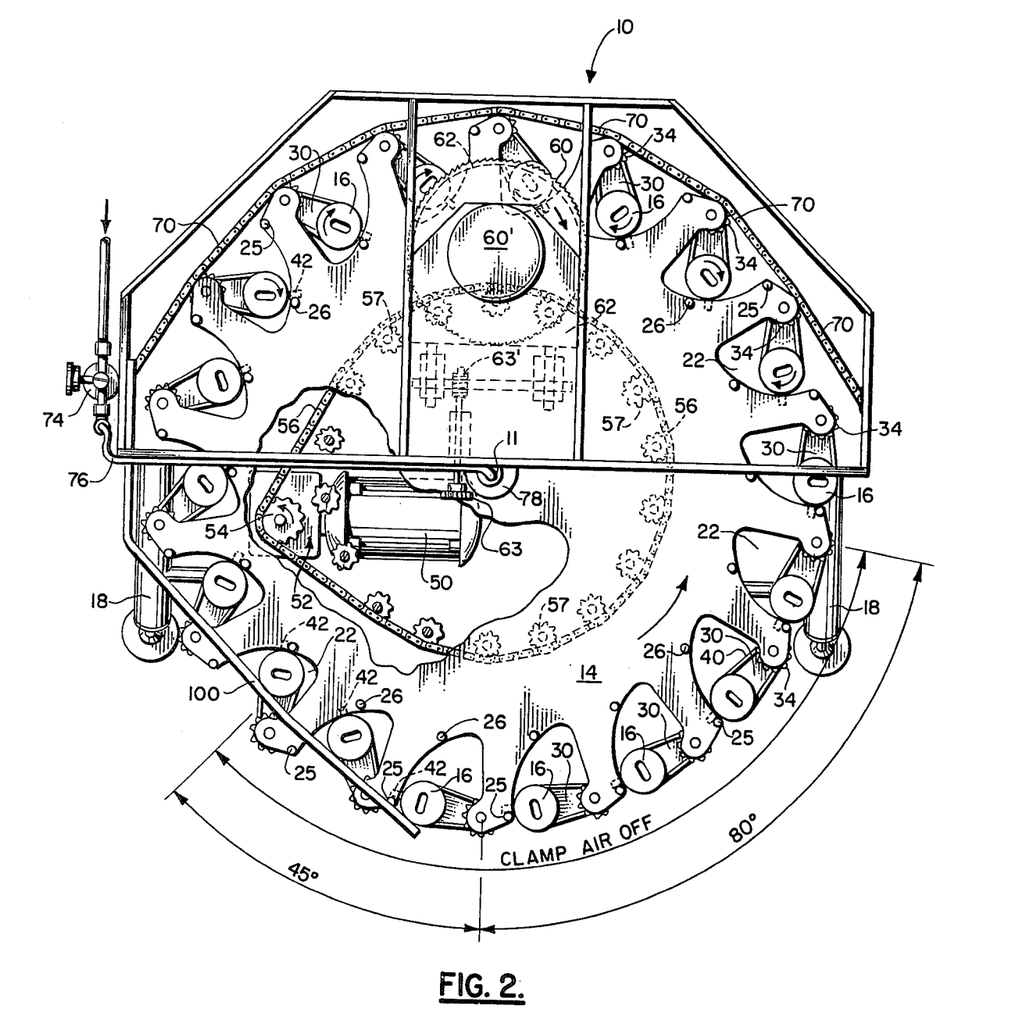
FIG. 2 is a partially cut-away plan view of the preferred embodiment of the present invention showing the rotating table with the cut-away portion revealing the turntable motor and gear reduction structures.

Turning now to FIG. 2 of the drawings, it can be seen that the peripheral edge portion of table 14 includes a lower portion 14' and is provided with a plurality of recessed notches 22 in which are pivotally mounted the aforementioned rotary claw holders 16. Each rotary claw holder 16 is allowed to pivot within notches 22 between a pair of stops 25, 26. An inspection of FIG. 3 illustrates how this pivotal movement is possible.

Figure 3:
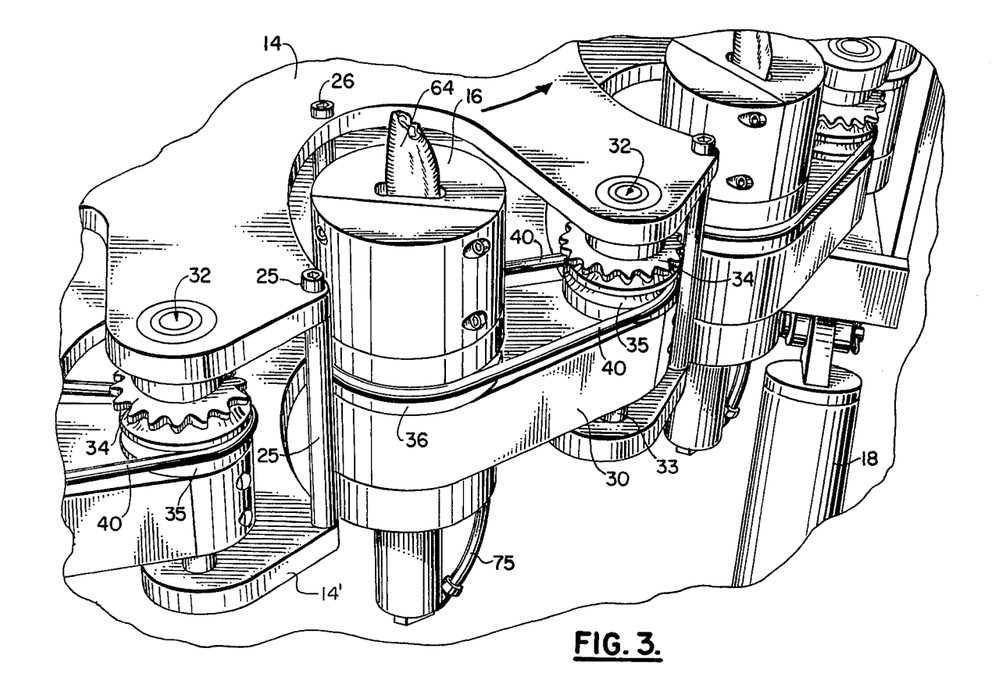
FIG. 3 is a partial, perspective view of the preferred embodiment of the apparatus of the present invention showing an individual rotary claw holder pivotally mounted on the outer peripheral edge of the rotating table.

As can be seen in FIG. 3, each rotary claw holder 16 is provided with an attached pivot arm 30. Pivot arm 30 pivots about the centerline of shaft 33 (note FIG. 5). Shaft 33 is rotatably mounted in bearings 32, 32'. At the opposite end portion of pivot arm 30 from shaft 33 is rotary claw holder 16 which is rotatably mounted thereon.

Figure 5:
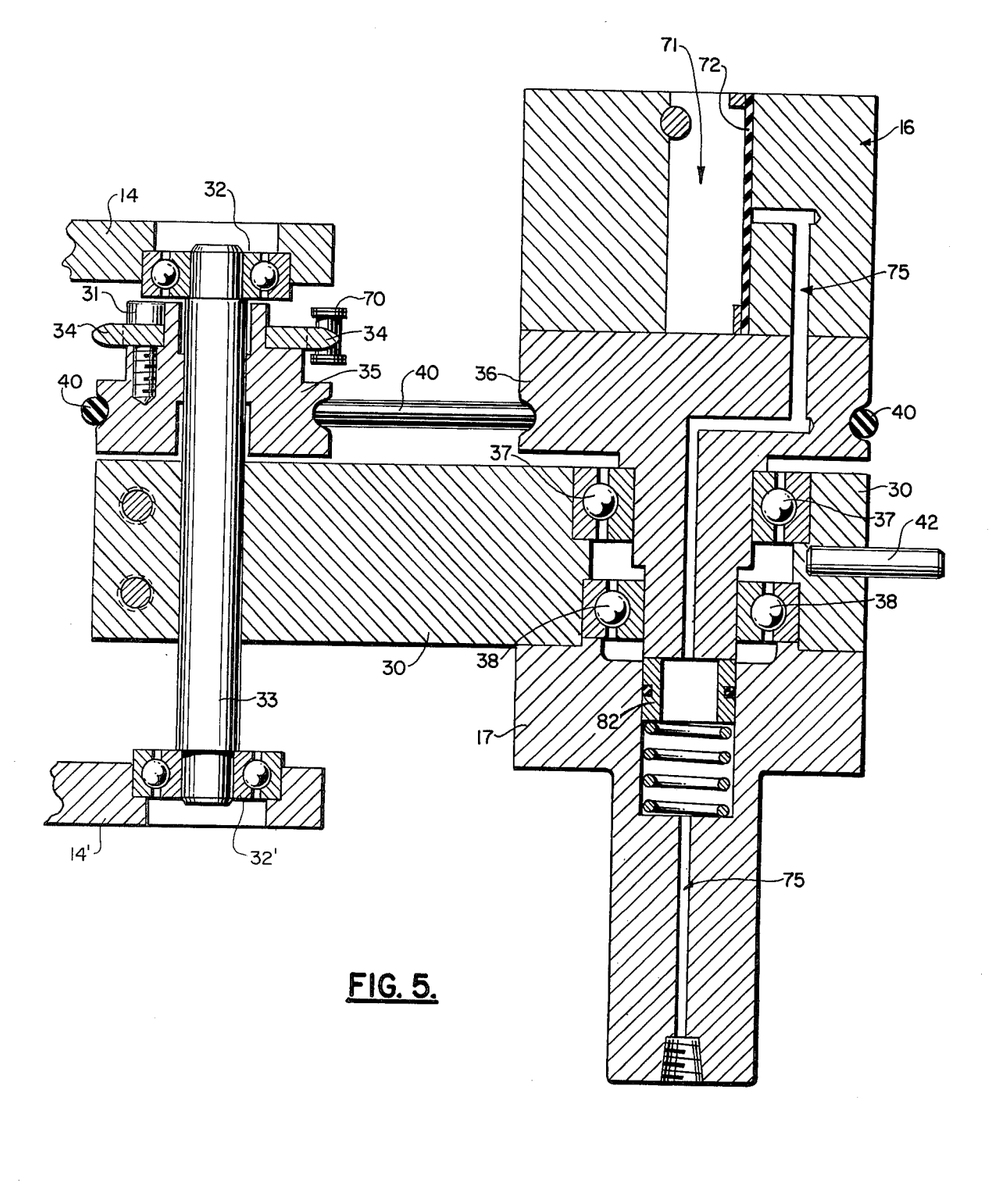
FIG. 5 is a side, cross-sectional view of the rotary claw holder of the preferred embodiment of the apparatus of the present invention.

FIG. 5 best illustrates the inner mechanical workings of rotary claw holder 16, pivot arm 30, and bearings 32, 32' with its associated shaft 33. A sprocket 34 is rotatably attached to shaft 33 on pulley 35 and rotates therewith on shaft 33 (see FIG. 5). Sprocket 34 is held in fixed engagement with pulley 35 by screw 31, both rotating freely on shaft 33. Rotary claw holder 16 is also provided with an attached pulley 36. Pulley 36 is rotably mounted in pivot arm 30 with bearings 37, 38. Drive belt 40 connects pulleys 35 and 36.

It can be seen from the foregoing that rotation of sprocket 34 and its attached pulley 35 about shaft 33 will produce rotation of pulley 36 and its attached rotary claw holder 16. It should be understood that rotation of sprocket 34, pulley 35, and pulley 36 does not prevent the independent rotation of shaft 33 within bearings 32, 32' which allows clawholder 16 to pivotally move within notch 22 of rotating table 14. The lower portion 17 of rotary claw holder (i.e., that portion below pivot arm 30 and bearings 37, 38) does not rotate within the pivot arm 30 but is fixed, unlike the claw holding portion 16.

The pivotal movement of pivot arm 30 and attached rotary claw holder 16 within notch 22 of rotating table 14 is limited by stops 25, 26. Each pivot arm 30 is provided with an outer tab 42 which stops upon hitting either stop 25 or 26, as can best be seen by examining FIGS. 2 and 5.

As illustrated best by FIG. 2, rotating table 14 is rotated in a preferably counterclockwise direction (see curved arrow, FIG. 2) by means of turntable motor 50. In the preferred embodiment turntable motor 50 is provided with a gear reduction system 52 which applies the rotational motion of turntable motor 50 to drive sprocket 54. Rotational motion of drive sprocket 54 drives chain 56 and attached fixed sprockets 57. Fixed sprockets 57 are rigidly affixed to the underside portion of rotating table 14. Rotating table 14 is rotatably mounted on central shaft 11, and it can be seen from the above that rotation of sprocket 54 drives chain 56 and attached sprockets 57 which are rigidly affixed to rotating table 14, and thereby rotate rotating table 14 about shaft 11.

Rotary saw 60 with its associated drive motor 60' are fixedly attached to upper processing unit 20 at the elevated portion of table 14. At least a portion of saw 60 projects over the notched portions 22 of rotating table 14 (see FIG. 2). As can best be seen in FIGS. 4, 7 and 8, rotating saw 60 is oriented substantially parallel to the upper surface of rotary claw holder 16 and spaced proximately thereto. Rotary saw 60 is provided with a movable, curved depth gauge stop 62 which allows adjustment of the depth of cut made by saw 60 in crab claw 64 (see FIGS. 7 and 8). To adjust the position of the depth gauge stop 62, a depth gauge adjustment knob 63 (FIG. 1) working through a worm gear drive 63' (FIG. 2) moves the curved stop 62 radially back and forth. Claw 64 is pneumatically clamped and held in rotary claw holder 16 during the cutting operation as will be described more fully hereinafter.

Each rotary claw holder 16 commences rotation when its respective sprocket 34 contacts fixed chain 70. Chain 70 is oriented to follow the arcuate path of each sprocket 34 as the sprocket 34 is carried along by rotating table 14.

Figure 6:
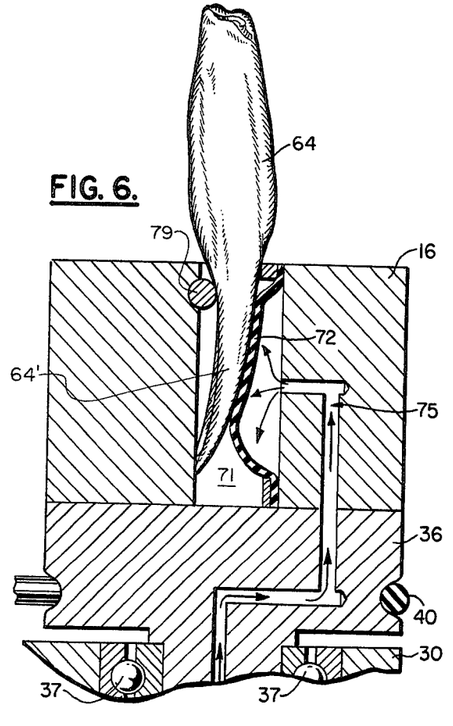
FIG. 6 is a partial, side, cross-sectional view of the rotary claw holder of the preferred embodiment of the apparatus of the present invention showing a crab claw being held prior to the cutting operation.

The lower, pincher portions 64' of the crab claws 64 (as can be seen best by FIGS. 6-8) are clamped and held in position in the elongated or extended chamber 71 in rotary claw holder 16 by flexible diaphragm 72 in cooperation with the curved head 79 and the opposing side wall of the chamber 71. Diaphragm 72 is inflated and expanded against the pincher portion 64' of the claw 64 (see FIG. 6) by a pneumatic air system which conveys control air (see arrows, FIG. 6) to the diaphragm 72.

As can be seen best in FIG. 2, control air can be supplied by conventional means through a piping system having a regulator 74 to control the pressure of the control air. The entering air can be piped through hoses 76 to a central rotary valve 78 and therefrom routed to each respective claw holder. The rotary valve can be so designed, as is known in the art, to supply air to each rotary claw holder throughout only a portion of the rotation of table 14. As can best be seen in FIG. 2, the clamp air (that is, control air supplied to each rotary claw diaphragm 72) is off in, for example, a (125°) arc as shown in FIG. 2. Design of the rotary valve 78 will automatically turn on clamp air and hold the diaphragm in the expanded position to thereby clamp claw 64 in position with its longitudinal axis at least generally parallel to the axis of rotation of the holder 16 and the saw 60 throughout the remaining arc of travel of a respective rotary claw holder 16. It can be seen that clamp air is only required to secure claws 64 when intermeshed with chain 70 and particularly when in contact with the saw 60.

In the preferred embodiment of the present invention, gravity is utilized to swing each rotary claw holder 16 pivotally between stops 25 and 26. The sequential positions of rotary claw holder 16 is illustrated in FIG. 2 in which the portion of rotating table 14 nearest saw 60 is elevated and the portion of rotating table 14 nearest the bottom portion of FIG. 2 is lowered thereby providing a tilt to table 14. This tilted orientation of table 14 can also be seen in FIG. 1. Thus, under the influence of gravity, rotary claw holder 16 will abut outer stop 25 at the lower portion of table 14 and gradually swing towards inner stop 26 of rotary table 14. A mechanical guide 100 is included at the lower side of the machine 10 to contact the edges of the claw holders 16, letting them go down to their lower extreme position of travel gently, rather than letting them flop down all at once. Since the saw 60 is located at the elevated portion of table 14, gravity will urge rotary claw holders towards saw 60 as each rotary claw holder approaches the saw 60. An important element of engineering design will be to so dimension and size rotary claw holders 16 that gravity will force crab claw 64 against saw 60 with sufficient force to enable a peripheral cut to be made in claw 64 by saw 60 as rotary claw holder 16 spins. (Note that in FIG. 2, no claw 64 is contained in claw holders 16; hence, claw holders 16 fall under saw 60 and depth gauge 62.)

It is noted that, in the preferred embodiment illustrated, the plane in which the pivot arms 30 move and the planes of rotation of the table 14 and the saw 60 are all parallel, while the pivot axis at shaft 33, and the axes of rotation of the claw holders 16, the table 14 and the saw 60 are also parallel.

Moving parts, such as saw 60 and sprockets 34 (when engaging chain 70) can be protectively covered by adding housing 80 to upper processing unit 20. Housing 80 does not cover that portion of the apparatus of the present invention 10 which is not in direct rotary contact with turntable motor 50 or saw 60, allowing an operator to add claws 64 to be processed, or to remove claws 64 which have been cut and are ready for shipment as a food product.

Although many cut claw shells come off naturally during the movement of the machine 10, auxiliary ejector means could be included if desired to positively eject the cut shells from the claws.

Operation

Figure 4:
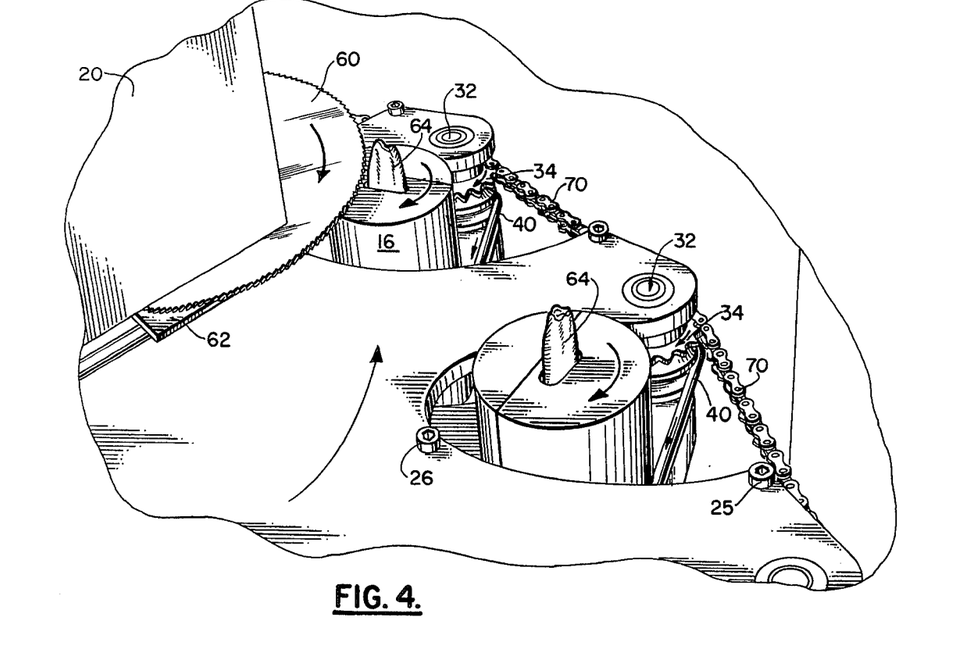
FIG. 4 is a partial, perspective view of the apparatus of the present invention illustrating the respective rotational directions of the rotating table, the rotary claw holders and the rotary saw, during the cutting operation.

FIGS. 2 and 4 best illustrate the rotational movements which occur in the operation of the apparatus of the present invention. Turntable motor 50 is the source of rotational energy to the entire apparatus. Motor 40 through gear reduction system 52 imparts rotary motion to sprocket 54 which drives chain 56. Chain 56 engages a plurality of fixed sprockets 56 which are rigidly affixed and attached to rotational table 14. Thus, rotation of sprocket 54 spins rotational table 14. Thus, rotation of sprocket 54 spins rotational table 14 about its central axis 11.

This rotation of table 54 additionally provides a rotational energy to rotate each respective rotary claw holder 16. Each rotary claw holder is rotated through a path of arcuate travel by rotating table 14. As can best be seen by FIG. 2, sprocket 34 engages chain 70 as rotational table 14 moves each respective rotary claw holder towards the fixed chain 70. The engagement of chain 70 by sprocket 34 and the corresponding movement of the sprocket 34 down the chain produces rotary motion to sprocket 34 and its attached pulley 35, which drives belt 40 and thus pulley 36 of rotary claw holder 16 (note FIG. 4). It can be seen by one skilled in the art that rotary claw holder 16 will spin as long as sprocket 34 is in cooperable engagement with chain 70.

A second type of motion which occurs in the operation of the present invention is the pivotal motion of rotary claw holder 16 within its respective recessed notch 22 at the outer periphery of rotary table 14. Pivotal motion of rotary claw holder 16 is affected by the movement of pivot arm 30 to which each rotary claw holder is attached on shaft 33. The pivoting of rotary claw holder 16 about the center of shaft 33 is effected by the force which gravity exerts on each rotary claw holder.

FIG. 2 illustrates the respective positions which each rotary claw holder 16 will maintain under the influence of gravity as each respective claw holder 16 is rotated (360°) about the central shaft 11 of rotating table 14. It can be seen by one skilled in the art that each rotary claw holder 16 will pivot towards outer stop 25 at the lower elevational portion of rotary table 14 and towards inner stop 26 at the upper elevational portion of rotational table 14. At the upper elevational portion of table 14, saw 60 makes the peripheral cut which is desired to process the crab meat as the rotary claw holder brings the claw 64 into engagement with saw 60.

Figure 7:
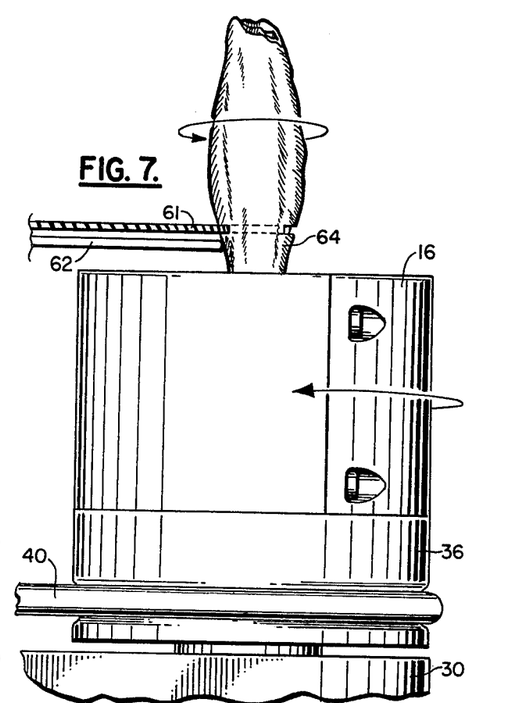
FIG. 7 is a partial, side view of the rotary claw holder of the preferred embodiment of the apparatus of the present invention illustrating the peripheral cut made in a crab claw by the rotary saw and its cooperative depth gauge.
Figure 8:
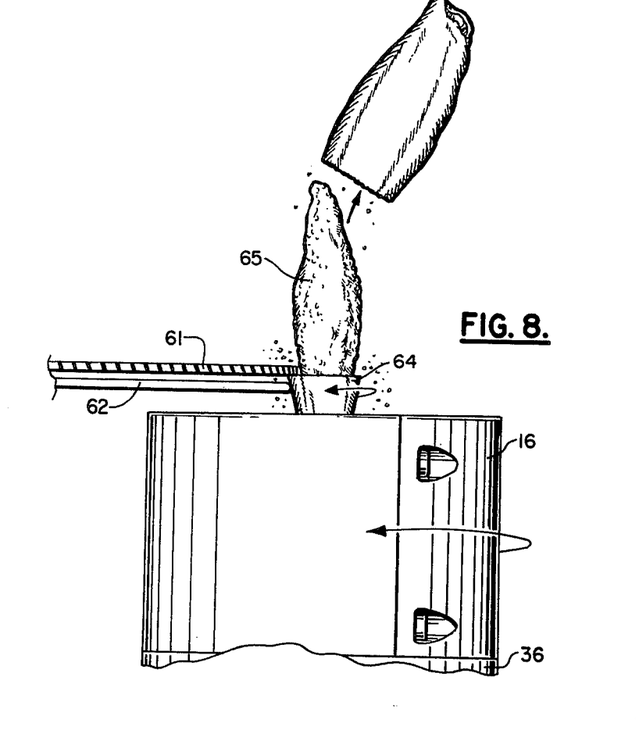
FIG. 8 is a partial, side view of the rotary claw holder of the preferred embodiment of the apparatus of the present invention illustrating the peripheral cut made by the rotary saw and corresponding removal of the claw exoskeleton to expose the meat product.

FIG. 2 illustrates the motion of rotary claw holder 16 without a crab claw contained therein, thus, as can be seen in FIG. 2, each rotary claw holder passes underneath blade 61 of saw 60 rather than stopping at its outer edge. However, FIG. 7 illustrates the method in which the peripheral cut is made. When a rotary claw holder is brought into contact with the blade 61 of saw 60, claw 64 will abut and contact blade 61 of saw 60. Depth gauge 62 additionally engages claw 64 when saw 60 begins to cut into claw 61 (note FIG. 7). Thus, it can be seen that depth gauge 62 by abutting claw 64 fixes the depth at which blade 61 can cut into the claw 64. It would be preferable for the depth gauge 62 to be so adjusted that only the exoskeletal portion of claw 64 is cut, thereby preventing damage by saw blade 61 to the meat portion 65 (see FIG. 8) of claw 64.

It is desirable during this cutting operation, in which a peripheral cut is made around claw 64, that claw 64 is sufficiently clamped and held in place inside rotary claw holder 16. Diaphragm 72 performs this task. As can best be seen in FIGS. 5 and 6, each diaphragm 72 is pneumatically activated by control air supplied through clamp air line 75. Conventional mechanical seals 82 can be provided between the rotational connections of rotary claw holder 16 to prevent leakage of clamp air through clamp air line 75. Clamp air can be supplied through rotary valve 78 to each rotary claw holder 16 during the portion of the arcuate path each rotary claw holder makes when in engagement with chain 70. FIG. 2 illustrates that portion of the arcuate path of rotary claw holder 16 when the clamp air supply is normally off in the apparatus of the present invention.

Exemplary Dimensions

Exemplary details of a machine 10 for an embodiment which has been built and successfully tested are outlined below:

| | |
|---|---|
| angle of inclination of table 14 to the horizontal | adjustable 0+ −30° (e.g. 10° -15°) |
| diameter of table 14 | 48" |
| length of pivot arm 30 | 4½" (centerline to centerline) |
| weight of claw holder 16 | approximately 16 oz. |
| depth of elongated holder chamber 71 | 2" |
| lateral dimensions of chamber 71 | ¼" × 1" |
| air pressure in line 75 | approximately 20 PSI |
| speed of rotation of table 14 | 1 to 5 RPM |

| speed of rotation of saw 60 | 3600 RPM |
|---|---|

Exemplary Variations

Although the embodiment described in detail above is considered preferred and quite satisfactory, many variations in approach and concept are of course possible. Thus, rather than positioning the rotary saw 60 within the arc defined by the travel of the holders 16 at the apogee of the travel, the saw could be positioned outside the arc at the lower, nadir of travel, and if a mechanical system were used for urging the holders toward the saw, it could be positioned on either side of travel. Additionally, it is possible to use multiple saws or cutting means other than rotary saws.

Thus, although a particular detailed embodiment of the crab claw processing apparatus has been described and illustrated, it should be understood that the invention is not restricted to the details of the preferred embodiment, and many changes in the design, configurations and dimensions are possible without departing from the scope of the invention. It should also be understood that, although crab claws have been processed successfully with the present invention and is thus considered the preferred, proven application, the present invention is applicable to other crustaceans such as for example lobsters, crawfish, etc., and the like.

What is claimed as invention is:

1. A machine for processing seafood to expose the inner meat product comprising:
   a support frame;
   a cutting section having at least one cutter means therein mounted on said frame;
   a multiple number of seafood holders placed in juxtaposition to said cutting section for cutting the exterior of the seafood in each said holder, each said holder having a holding section for holding the seafood with respect to said cutter means while it is being cut;
   limit means for limiting the depth of cut for producing a peripheral cut in the outer portion of the seafood as the seafood is moved; and
   movable, carrying means on which said holders are rotatably mounted in spaced array for carrying and moving said holders with their seafood into and out of engagement with said cutter means in sequential fashion, said carrying means being movably mounted on said frame; said movable carrying means comprising a rotary frame; said holders being also pivotably mounted around the periphery on said rotary frame, said holders being urged toward said cutter means while the seafood is being cut; the plane of rotation of said holders on said rotary frame being inclined, making a significant angle with respect to the horizontal plane, and the cutting edge of said cutter means being located totally within the area circumscribed by said rotary frame and near one vertical extreme of travel of said holders, said holders being mounted on said rotary frame by means of pivot arms which are generally freely movable, gravity being the force causing the urging of said holders toward said cutting means toward and into the interior of said rotary frame about said pivot arm, said holders being moved away from said cutter means by the rotation of said rotary frame.

2. The machine of claim 1 wherein mechanical stop means associated with said rotary frame are provided for limiting the pivotal distance through which each holder pivots on said rotary frame.

3. The machine of claim 1 wherein the plane in which said pivot arm travels and the plane of cutting of said cutter means and the plane of rotation of said rotary frame are all at least substantially parallel; the pivot axis of said pivot arms and the axes of rotation of said holders and said rotary frame are all at least substantially parallel, and said vertical extreme of travel is the apogee of travel.

4. The machine of claim 1 wherein said cutter means is a rotary saw, the axis of rotation of said saw being located within the arcuate path defined by said holders as they are moved about said rotary frame.

5. The machine of claim 4 wherein the axis of rotation of said rotary frame is offset a substantial distance from the axis of rotation of said rotary saw.

6. The machine of claim 1 wherein said holding section is elongated and is suitable for the pincher portion of a crab claw to be positioned and held in, the direction of elongation being at least generally parallel to the longitudinal axis of the claw.

7. The machine of claim 6 wherein said holder section comprises a housing having an elongated chamber means for receiving the pincher portion of the claw.

8. The machine of claim 7 wherein said chamber means further includes a pneumatically operated, expandible diaphragm means within said chamber for clamping the pincher portion of the claw.

9. A machine for processing seafood to expose the inner meat product comprising:
   a support frame;
   a cutting section having at least one cutter means therein mounted on said frame;
   a multiple number of seafood holders placed in juxaposition to said cutting section for cutting the seafood in each such holder, each said holder having a holding section for holding the seafood with respect to said cutter means while it is being cut;
   limit means for limiting the depth of cut for producing a peripheral cut in the outer portion of the seafood as the holder is rotated;
   movable, carrying means on which said holders are rotatably mounted in spaced array for carrying and moving said holders with their seafood into and out of engagement with said cutter means in sequential fashion, said carrying means being movably mounted on said frame; said movable, carrying means comprising a rotary frame; and
   drive means for rotating the holders comprising:
   i. sprocket means associated with each of said holders for causing it to rotate; and
   ii. static chain means mounted in an arcuate path on said support frame about said rotary frame in proximity to said cutter means, the plane of said arcuate path being parallel to the plane of rotation of said rotary frame, for cooperatively engaging and rotating each said sprocket means as it moves past said chain means and said cutter means, said holder firmly grasping said seafood, the sprocket, holder and seafood therein thereby being rotated together by the action of said chain means.

10. The machine of claim 9 wherein said rotary frame makes repetitive three hundred and sixty degree rotations and said holders are mounted about the periphery of said rotary frame in spaced positions.

11. The machine of claim 9 wherein said cutter means is a rotary saw.

12. The machine of claim 11 wherein the axis of rotation of said rotary saw is located within the arcuate path defined by said holders as they are moved about on said rotary frame.

13. The machine of claim 11 wherein the axis of rotation of said rotary frame is offset a substantial distance from the axis of rotation of said rotary saw.

14. The machine of claim 9 wherein said claw holders are also pivotably mounted on said rotary frame, said holders being urged toward said rotary saw while their respective seafood is being cut.

15. The machine of claim 14 wherein the pivotal mounting of said holders allows said holders to move toward the cutter means at least substantially into where the seafood holding area is located and wherein there is further included guage means for guaging the depth of cut of the seafood, said gauge means comprising a movable mechanical stop means adjacent to the cutting edge of said cutter means on the side of the edge opposite the holder and its seafood for bearing against and stopping each seafood portion from moving too far past said cutting edge, said stop means being movable with respect to said cutting edge.

16. The machine of claim 9 wherein said carrying means comprises a rotary frame rotating in a plane at a significant angle to the horizontal and having freely movable pivot arms pivotally mounted thereon spaced about its periphery, said holders being carried by the free ends of said pivot arms, said sprocket means being attached to the pivots of said pivot arms, there being further provided mechanical means for transmitting the rotary motion of said sprocket means to said holders.

* * * * *